(12) United States Patent
Elden

(10) Patent No.: US 7,066,476 B2
(45) Date of Patent: Jun. 27, 2006

(54) SIDE ATTACHABLE COVER/SEAT FOR A CART CARRYING BOX

(76) Inventor: Richard Elden, 2629 Manhattan AV, PMB 223, Hermosa Beach, CA (US) 90254-2447

( * ) Notice: Subject to any disclaimer, the term of this patent is extended or adjusted under 35 U.S.C. 154(b) by 248 days.

(21) Appl. No.: 10/278,692

(22) Filed: Oct. 22, 2002

(65) Prior Publication Data

US 2004/0075248 A1  Apr. 22, 2004

(51) Int. Cl.
*B62B 1/00* (2006.01)
(52) U.S. Cl. ........................ 280/37; 280/47.26; 220/379
(58) Field of Classification Search ............ 280/47.26, 280/47.24, 47.131, 37, 38; 224/411, 275; 62/457.7; 70/79; 220/331, 212, 796, 751, 220/756, 915.1, 915.2, 752, 790, 814, 379 220/676, 802, 298, 302, 323
See application file for complete search history.

(56) References Cited

U.S. PATENT DOCUMENTS

| | | | | |
|---|---|---|---|---|
| 245,635 | A * | 8/1881 | Jennings | 220/379 |
| 678,024 | A * | 7/1901 | Norris | 217/81 |
| 2,957,596 | A * | 10/1960 | Rehborg | 215/386 |
| 3,197,060 | A * | 7/1965 | Farniok et al. | 220/814 |
| 3,230,006 | A * | 1/1966 | Sokolis | 297/188.1 |
| 4,048,050 | A * | 9/1977 | Hillman | 206/1.5 |
| 4,238,049 | A * | 12/1980 | Lehmann et al. | 220/812 |
| 4,453,530 | A * | 6/1984 | Schlosser | 126/25 R |
| 4,460,188 | A * | 7/1984 | Maloof | 280/30 |
| 5,064,088 | A * | 11/1991 | Steffes | 220/837 |
| 5,100,198 | A * | 3/1992 | Baltzell | 312/235.2 |
| 5,269,157 | A * | 12/1993 | Ciminelli et al. | 62/457.7 |
| 5,505,142 | A * | 4/1996 | Fink | 108/129 |
| 5,553,701 | A * | 9/1996 | Jarecki et al. | 206/15.2 |
| 5,683,097 | A * | 11/1997 | Fenton et al. | 280/655.1 |
| 5,730,451 | A * | 3/1998 | Walker | 280/47.26 |
| 5,876,047 | A * | 3/1999 | Dennis | 280/47.35 |
| 6,047,976 | A * | 4/2000 | Wang | 280/47.315 |
| 6,123,210 | A * | 9/2000 | Kim | 215/11.6 |
| 6,176,499 | B1 * | 1/2001 | Conrado et al. | 280/47.26 |
| 6,185,917 | B1 * | 2/2001 | Goudes | 56/12.8 |
| 6,264,216 | B1 * | 7/2001 | Wilson | 280/30 |
| 6,550,860 | B1 * | 4/2003 | Lombardi | 297/217.1 |

* cited by examiner

*Primary Examiner*—Christopher P. Ellis
*Assistant Examiner*—Christopher Bottorff
(74) *Attorney, Agent, or Firm*—Thomas I. Rozsa

(57) ABSTRACT

A molded cover/seat secures over an opening in a carrying box on a two-wheeled cart to serve as a cover and a seat. The cover/seat has a smooth top for sitting and a ribbed waffle pattern bottom for strength. An encircling flange with interior corner protrusions securely engages the top of the carrying box. Semicircular recesses in one edge accommodate the two rods of the handle. Bottom protrusions engage a hand hole on one side of the carrying box to secure the cover/seat to the side of the carrying box for storage and transport.

5 Claims, 6 Drawing Sheets

SIDE ATTACHABLE COVER/SEAT FOR A CART CARRYING BOX

BACKGROUND OF THE INVENTION

1. Field of the Invention

The present invention relates to detachable seats for wheeled carts and in particular to a detachable cover/seat for a carrying box on a wheeled cart which cover/seat may be attached to the side of the carrying box when not being used as a cover/seat.

2. Description of the Prior Art

In utilizing a two-wheeled cart or hand truck with a carrying box for carrying anything from groceries to tools, it is convenient to have a cover for the carrying box to shelter the items being carried and also convenient to be able to utilize that cover as a seat as well since the two-wheeled cart or hand truck is capable of standing in a stationary position with the front of the cart or carrying box contacting the ground for stability. After working using the tools in the cart or transporting a load in the cart it is convenient to be able to use the cover of the carrying box as a seat or often convenient to utilize the cover-seat to do work which may be done in a sitting position.

A problem exists when moving the two-wheeled cart or hand truck with the cover off, such as when the load in the carrying box sticks out too far to permit the cover to rest on the carrying box or when it is desirable to carry something with no cover on the carrying box. The problem is what to do with the cover. And also, how to keep from losing the cover if it is not in place on the carrying box during the moving.

A number of prior art patents have addressed the problem of providing a seat for a wheeled cart, which might also serve as a cover in some cases. None have provided a convenient place for attaching the cover to another portion of the cart for transporting it when it is not being used as a cover or seat.

U.S. Pat. No. 4,460,188, issued Jul. 17, 1984 to Maloof, shows a cart which has a hollow base portion for the storage of articles and which also provides a seat. An elongated handle is pivotally mounted on the base with a draw bar at one end and with wheels mounted on the opposite end. The handle has three positions. When it is fully extended it is swung to a cart pulling position which moves the wheels downwardly from the base to provide a wheeled cart with storage. When the handle in its extended position is turned to a second and generally vertical position the wheels are raised and a back rest is provided for the seat. In the third position, the handle folds into sections so that the entire cart assembly occupies a space only slightly larger than the base for being carried in a car trunk or otherwise.

U.S. Pat. No. 6,264,216, issued Jul. 24, 2001 to Wilson, a multi-purpose cart device having wheels and including a first section and a second section. Each section includes a hollow interior area that can be used for storing and maintaining any desired items. The sections can be fabricated from insulating material to allow for each section to act as a cooler. Each section further includes a mechanism for enabling it to convert to a chair when desired. Located between each section is a foldable and collapsible table. The final product is a cart that is beneficial, advantageous, and one, which will simplify and minimize the process of carrying and taking items to a recreational event.

U.S. Pat. No. 6,185,917, issued Jan. 13, 2001 to Goudes, provides a versatile, lightweight and compact utility cart for supporting and transporting a variety of landscaping appliances. The utility cart includes a base defining a generally planar platform, a plurality of wheels rotatably mounted to the base and a handle extending upwardly from the base. The utility cart may also include a mounting arm extending outwardly from the base in the plane of the platform for adjustably mounting an accessory of the landscaping appliance. In one embodiment, the utility cart further includes a retaining arm pivotally mounted to the base and the retaining arm includes an adjustable retaining guide for temporarily retaining the landscaping appliance between the retaining arm and the platform. In a second embodiment, the utility cart further includes a mounting bracket having a U-shaped flange at one end and an L-shaped flange at the other end for temporarily securing the landscaping appliance to the platform. When the utility cart is utilized to support and transport a conventional hand-held leaf blower, the mounting bracket includes a plurality of vibration isolators for absorbing vertical shocks and forces transferred to the leaf blower and for diminishing the vibration transferred to the operator. The utility cart supports and transports a conventional hand-held leaf blower so that the leaf blower may be used over a large area or for an extended period of time and is readily converted to support and transport a garden caddy including a seat so that a user can work comfortably for extended periods of time.

U.S. Pat. No. 5,269,157, issued Dec. 14, 1993 to Ciminelli, describes an insulated beach box in which ice, beverages and various other food products may be placed with the ice maintaining the beverages and food products at a cold and fresh condition even though the beach box is placed on the beach where it may be relatively hot. The beach box includes structural features and attachments which enables the box to be effectively used as a beach chair having a seat back pivotally connected thereto which forms a pull handle when oriented generally in perpendicular relation to the top of the box which forms a seat. The box includes wheels and a rounded corner surface generally in alignment with the seat back which enables the device to be easily pulled over a hard surface by using the wheels and over sand by using the curved corner and adjacent surfaces of the box to facilitate the beach box being pulled to a desired site. The seat back includes pockets for storage of various items and is pivotally supported from the box to enable the seat back to be pivoted forwardly to a generally horizontal position to enable the beach box to be carried by the use of end handles or stored. The seat back also provides an effective support for an optional umbrella which can be detachable clamped thereto and enables various other items that may be carried to or from the beach to be supported by placing them against the upper surface of the seat and the front surface of the seat back with such items being strapped in position if desired.

U.S. Pat. No. 5,876,047, issued Mar. 2, 1999 to Dennis, discloses a utility cart which includes a cart frame fitted with a pair of fixed rear wheels and a pair of steerable front wheels and further including an ice chest or ice chest receptacle with double hinged lids and lid covers and a storage compartment located adjacent to the ice chest. Removable chair supports are upward-standing from the storage compartment for stacking one or more folded lawn chairs or the like, supporting an auxiliary table top and to provide a location for hanging a trash bag. Two or more tables are hinged to the cart frame in drop-leaf fashion for selected horizontal extension and support by means of hinged members. One of the ice chest lid covers doubles as a table and may be optionally supported by a collapsible handle optionally used for towing the utility cart. A pair of vertically-aligned umbrella brackets receive an umbrella support to shade the utility cart and the utility cart components, including the cart walls, and ice chest lids, are constructed of expanded foam insulation sandwiched between plastic sheets.

U.S. Pat. No. 5,100,198, issued Mar. 31, 1992 to Baltzell, is for a seat cooler including a cushion seat member removably mounted relative to an underlying cabinet, wherein the cabinet includes a cooler chest defined by an extensible and retractable drawer container within the cabinet. A modification of the invention includes an extensible cushion member overlying the drawer, and further including retractable wheels mounted to side walls of each cabinet for portability of the organization.

What is needed is a removable seat for a wheeled cart that has a means for attaching the seat to the cart when not in use

SUMMARY OF THE INVENTION

An object of the present invention is to provide a combination cover and seat for a carrying box on a two-wheeled cart or hand truck.

Another object of the present invention is to provide a cover/seat for a carrying box on a two-wheeled cart or hand truck which is attachable to the side of the carrying box to be out of the way when not being used as a cover or seat and to be transportable while attached to the side of the carrying box.

A related object of the present invention is to provide the cover/seat for the carrying box on the two-wheeled cart or hand truck with protrusions which can engage the hand hole on a side of the carrying box to secure the cover/seat to the side of the carrying box for storage and transporting.

One more object of the present invention is to provide a cover/seat for a carrying box on a two-wheeled cart or hand truck which has corner means for securely fitting over the opening in the carrying box with a secure snap fit.

In brief, a cover/seat for a carrying box on a two-wheeled cart or hand truck comprises a flat-topped rigid plate with an encircling side flange and interior corner protrusions on the encircling side flange for engaging the corners of the carrying box with the cover/seat snap fit onto the top of the carrying box over the top opening of the carrying box.

The cover/seat completely covers the top opening in the carrying box and may be used as a seat with the two-wheeled cart or hand truck in a stationary position with the Front of the carrying box or cart contacting the ground. The long handles at the back of the two-wheeled cart may be used as a backrest while sitting on the cover/seat.

An underside of the cover/seat has a number of protrusions configured to engage a hand hole on the side of the carrying box with a tight friction fit to enable the cover/seat to be secured to the side of the carrying box with the cover/seat protrusions engaging the hand hole for storage and transporting.

The cover is preferably fabricated of injection molded plastic with back circular edge recesses to accommodate the handles and a waffle grid on the underside of the cover/seat for extra strength to support a person sitting on the cover/seat. The protrusions on the bottom for the hand hole stick out beyond the waffle grid for insertion in the hand hole on the side of the carrying box.

An advantage of the present invention is to have both a cover and a seat all-in-one for a carrying box on a two-wheeled cart or hand truck.

Another advantage of the present invention is that the cover seat attaches securely to the top of the carrying box to be used as a cover and/or a seat.

An additional advantage of the present invention is that the cover/seat is securely attachable to a side of the carrying box for storage or transport.

BRIEF DESCRIPTION OF THE DRAWINGS

These and other details of my invention will be described in connection with the accompanying drawings, which are furnished only by way of illustration and not in limitation of the invention, and in which drawings.

BEST MODE FOR CARRYING OUT THE INVENTION

Figure 1:
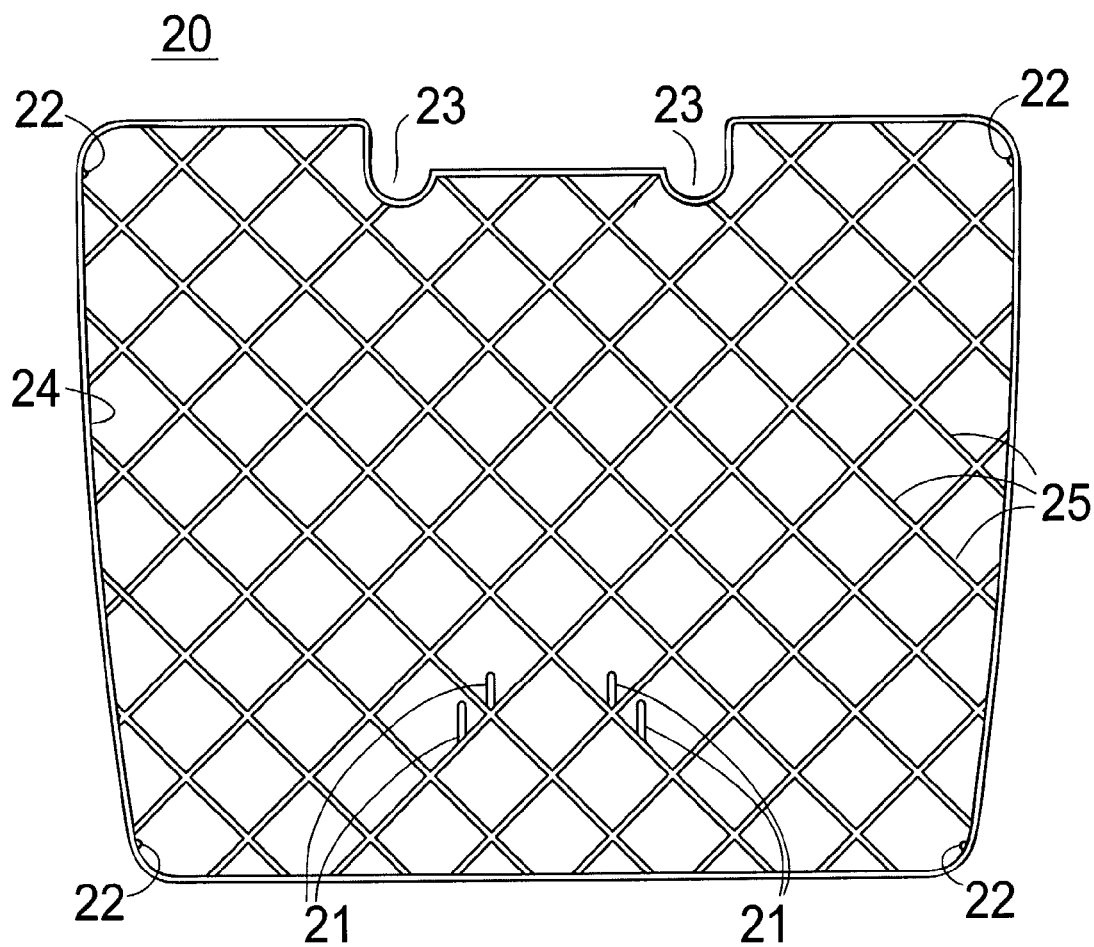
FIG. 1 is a bottom plan view of the cover/seat of the invention showing the semicircular recesses on one side edge to accommodate the handles of the cart, the waffled bottom surface, the encircling flange with corner protrusions, and the protrusions for engaging the hand hole on the side of the carrying box.
Figure 2:
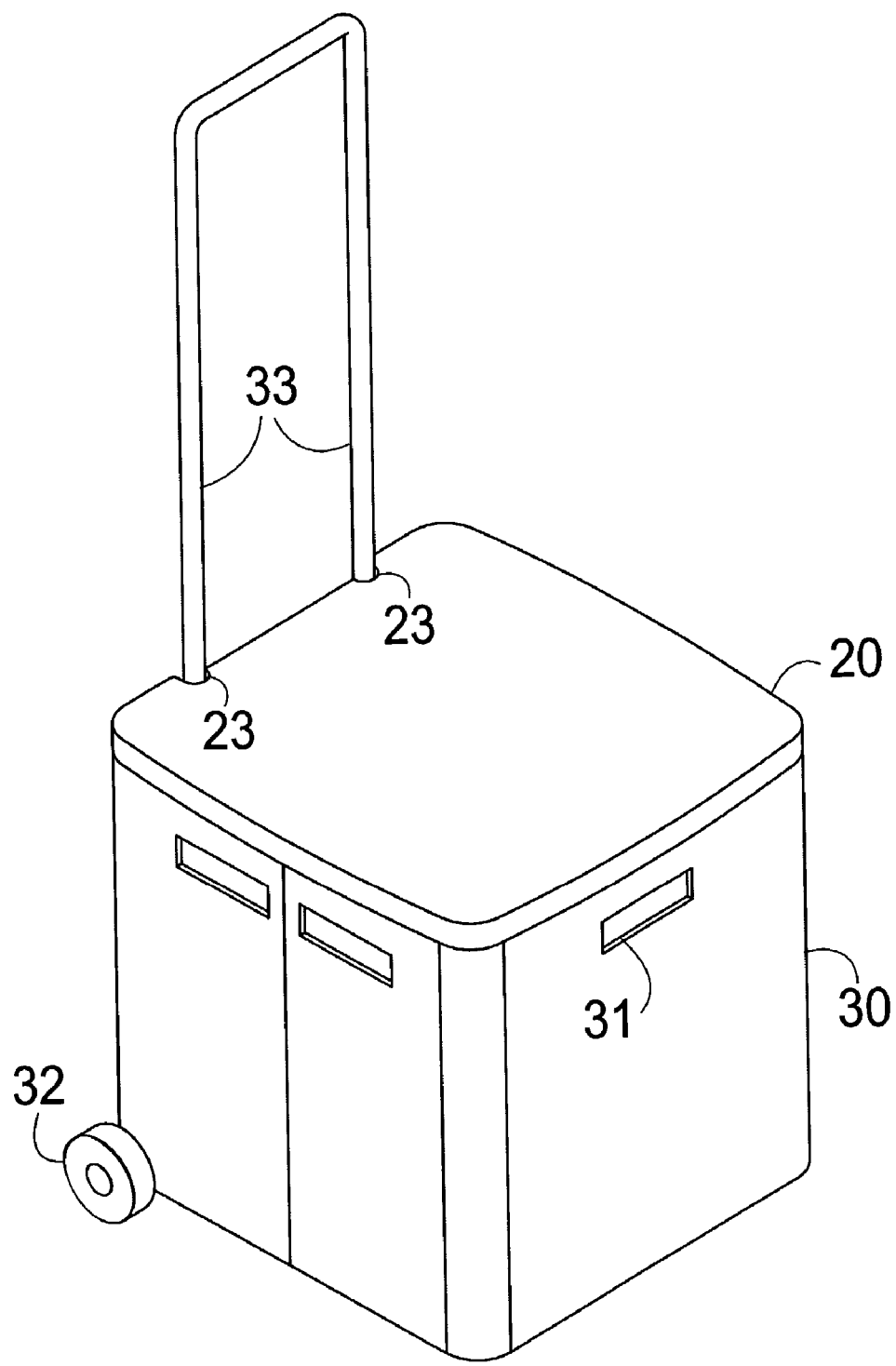
FIG. 2 is a perspective view of the two-wheeled cart or hand truck with the cover/seat secured in place over the top of the carrying box to be used as a cover and/or a seat.
Figure 4:
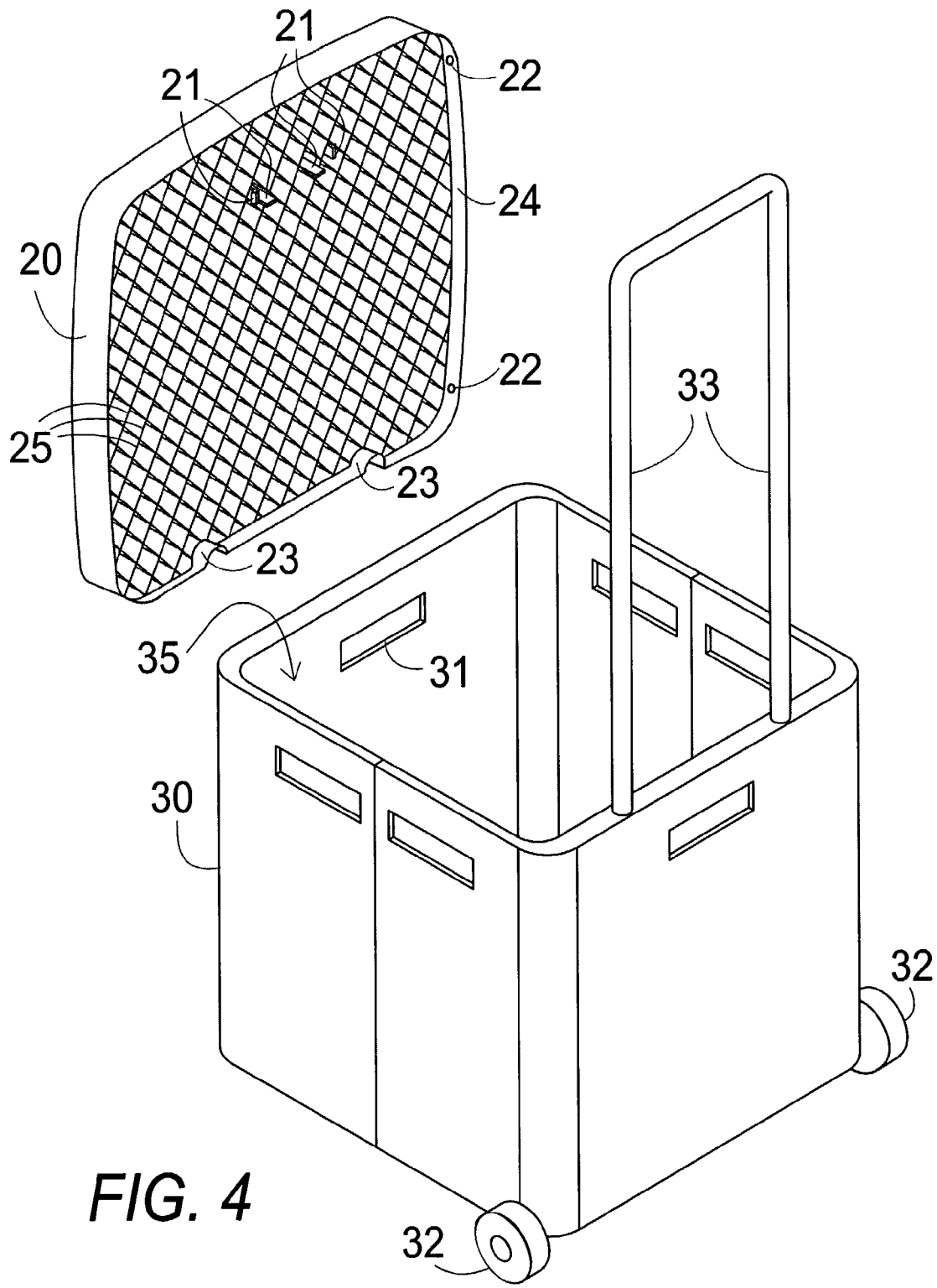
FIG. 4 is a perspective view of the two-wheeled cart or hand truck with the cover/seat elevated in a vertical orientation for lowering onto a front side of the carrying box.
Figure 5:
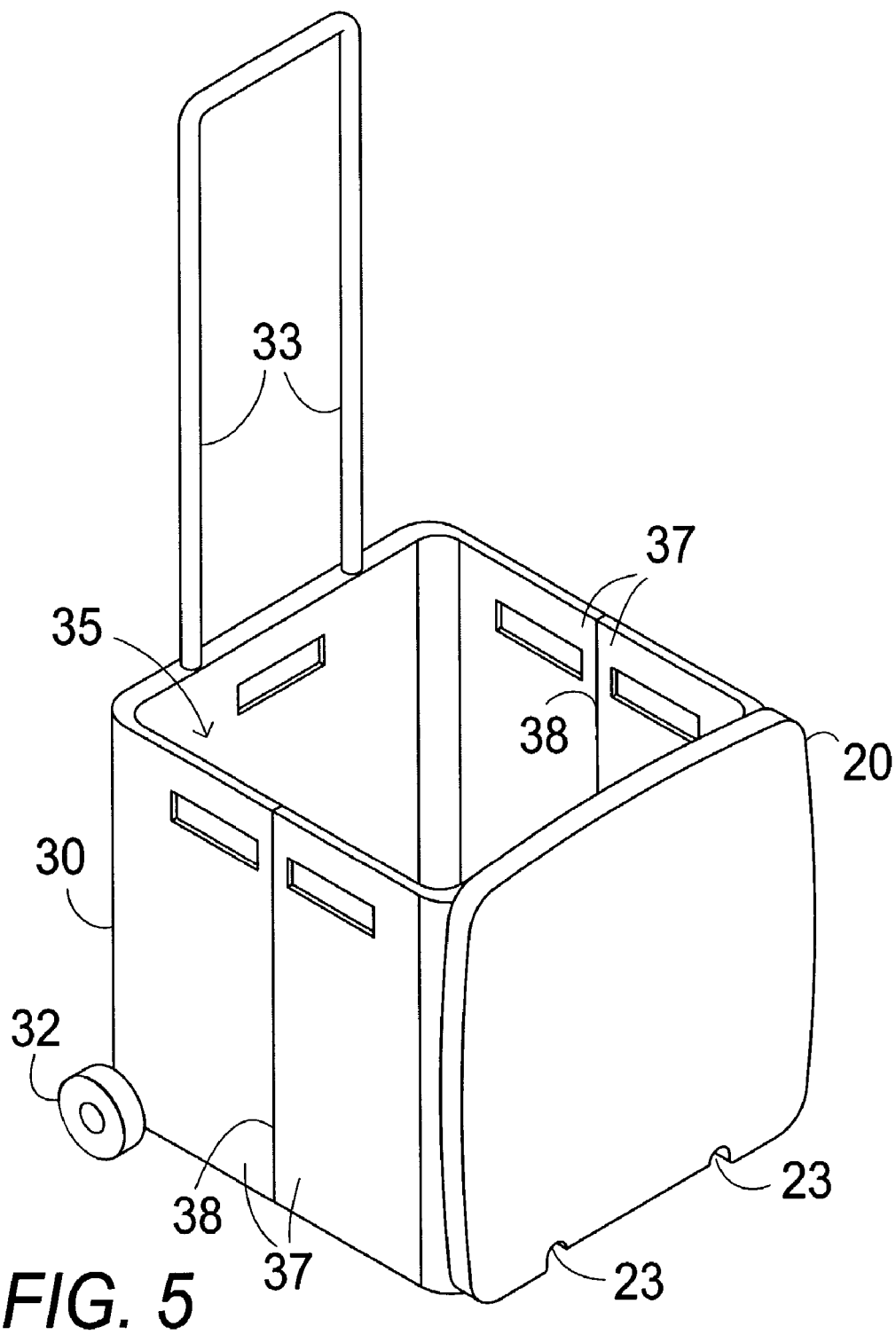
FIG. 5 is a perspective view of the two-wheeled cart or hand truck with the cover/seat attached to a front side of the carrying box.
Figure 6:
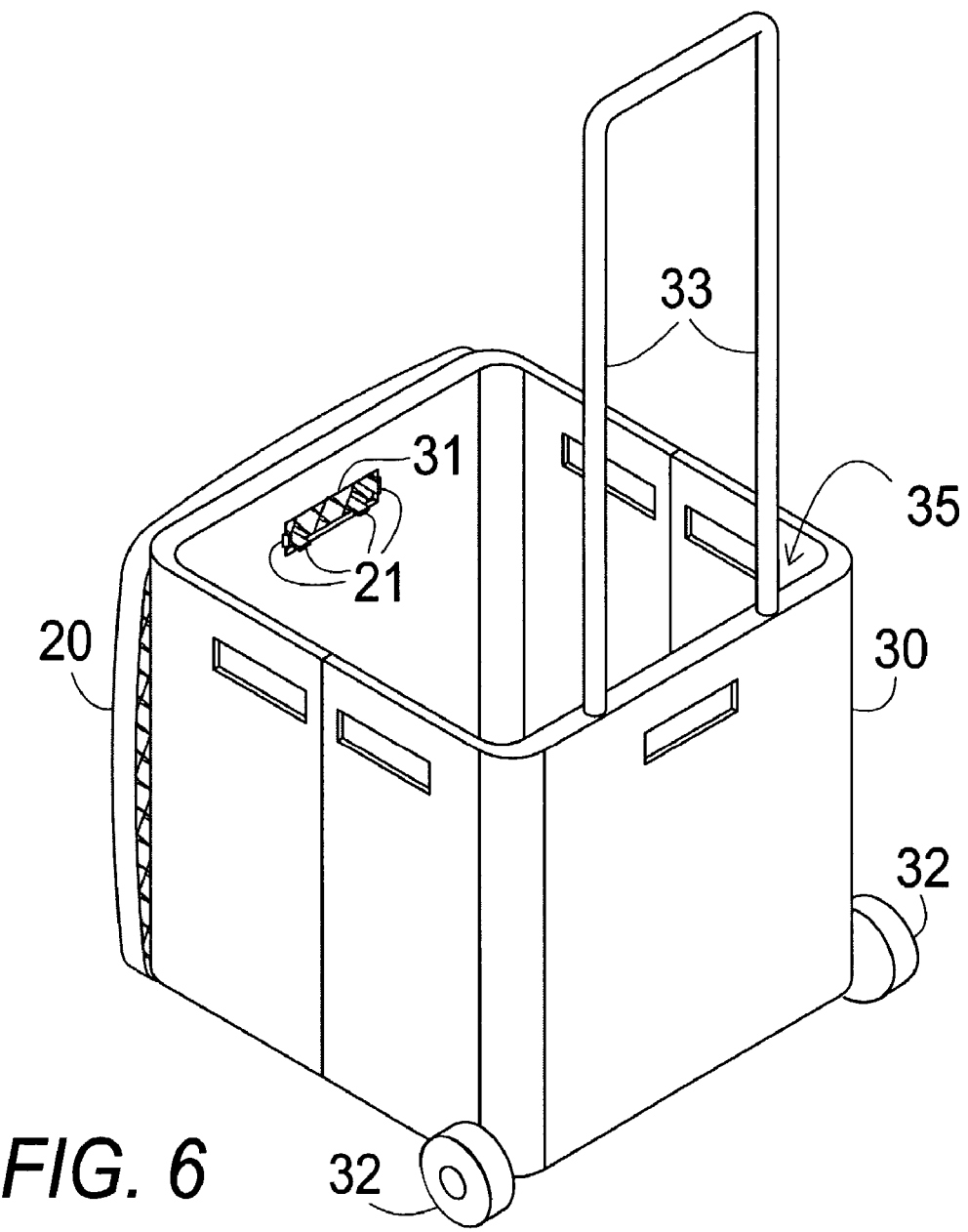
FIG. 6 is a perspective view of the two-wheeled cart or hand truck with the cover/seat attached to the front side of the carrying box showing the bottom protrusions of the cover inserted in the hand hole on the front side of the carrying box.

In FIGS. 1–6, the invention comprises a cover/seat 20 for a carrying box 30 which has a top opening 35 and a side hand hole 31. The cover/seat 20 is a rigid planar surface having a smooth top surface for sitting and conforms in shape to the top opening 35 in the carrying box 30. The cover/seat 20 fits securely on the carrying box 30, as seen in FIG. 2 to serve as a cover and a seat. The cover/seat 20 has a number of protrusions 21, preferably four, on a bottom surface capable of fitting into the hand hole 31, as seen in FIG. 6, on a side of the carrying box 30 with a tight friction fit for securing the cover/seat 20 to the side of the carrying box 30.

The carrying box 30 is preferably mounted on a two-wheeled cart or hand truck having back wheels 32 and a long handle with two side rods 33 and cover/seat 20 has a pair of semicircular recesses 23 on an edge of the cover/seat to accommodate the handle rods 33 therein with the cover/seat 20 installed over the top opening of the carrying box 30, as in FIG. 2.

In FIGS. 1 and 4, the cover/seat 20 further comprises an encircling flange 24 which extends around the top opening 35 of the carrying box and the flange has corner protrusions 22 which engage the exterior surfaces of the carrying box at the corners to secure the cover/seat 20 over the carrying box opening 35.

The cover/seat 20 is preferably formed of molded plastic with a ribbed waffle pattern 25 on a bottom surface for strength.

The carrying box 30 is preferably one which folds flat for storage so that the cover/seat 20 may be attached to the side of the carrying box in the open box position, as seen in FIGS. 5 and 6 as well as in the folded flat position for storing the carrying box and cart in a trunk of a vehicle, a closet or other storage space. The side panels 37 of the carrying box 30 fold in along the hinged fold lines 38 to collapse the carrying box 30 leaving the front and back sides of the box intact so that the cover/seat can remain attached to the front side of the carrying box 30 when it is folded flat. The cover/seat need never be lost since it can always be attached to the carrying box either as a cover/seat 20 as in FIG. 1 or attached to the side as in FIGS. 5 and 6.

Figure 3:
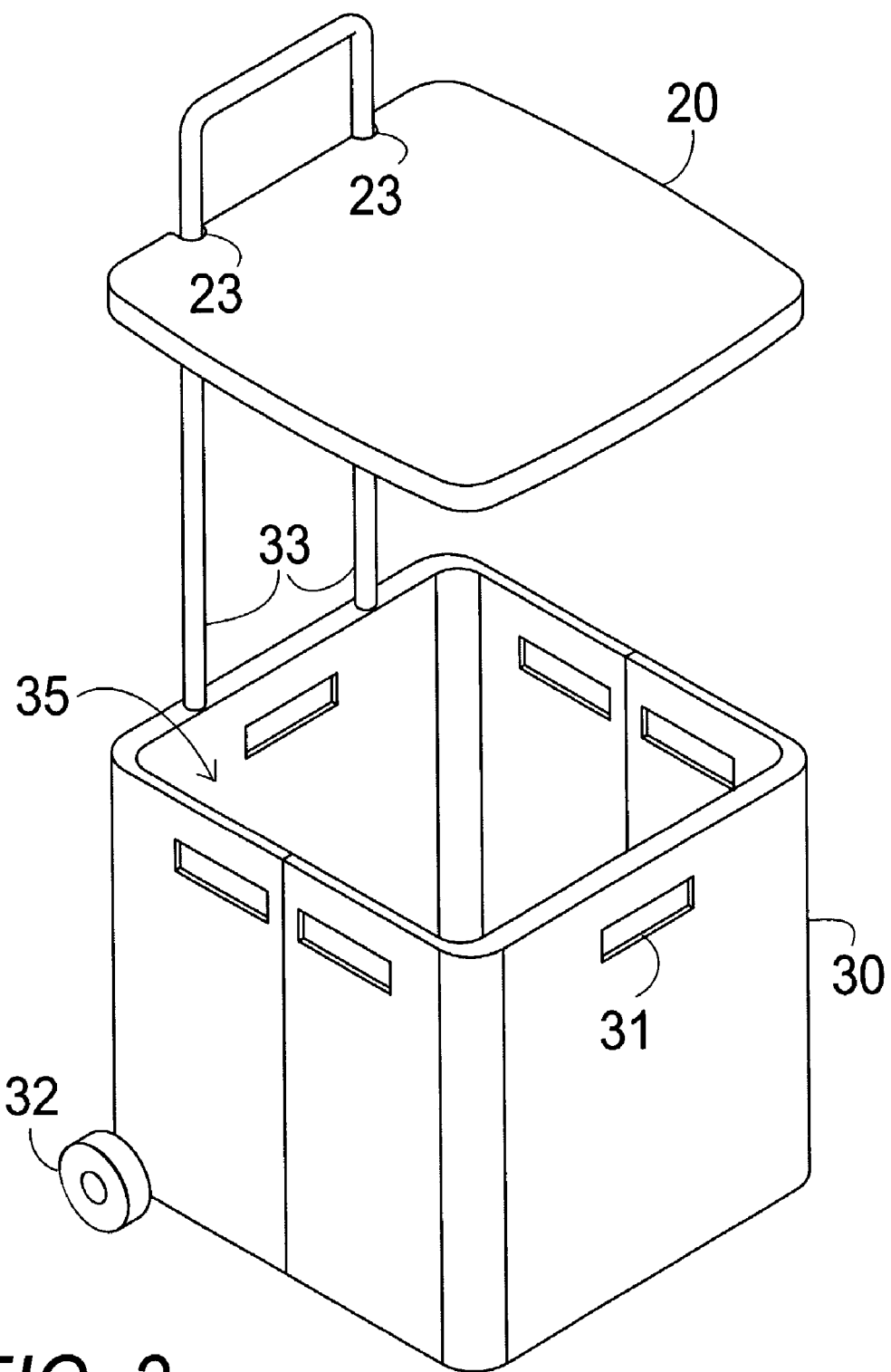
FIG. 3 is a perspective view of the two-wheeled cart or hand truck with the cover/seat elevated above the opening of the carrying box in alignment for placement thereon.

In practice, in FIG. 1 the cover/seat 20 fits securely over the opening 35 in the carrying box 30 and may be lifted off, as in FIG. 3, and rotated into a vertical position, as in FIG. 4 for attaching to a front side of the carrying box 30 with the bottom protrusions 21 engaging the hand hole 31 in the carrying box 30, as in FIGS. 5 and 6.

It is understood that the preceding description is given merely by way of illustration and not in limitation of the invention and that various modifications may be made thereto without departing from the spirit of the invention as claimed.

What is claimed is:

1. A combination cover and seat for a carrying box having a top opening and a front side hand hole, the combination cover and seat comprising:
   a rigid planar surface smooth and flat on top conforming in shape to a top opening in a carrying box having a top opening and a front side hand hole to admit a hand of a user for lifting the carrying box, the rigid planar surface fitting securely thereon in a first position over the top opening to serve as a cover and a seat on top of the carrying box, the rigid planar surface having at least two protrusions on a bottom surfaces, the protrusions configured to engage the hand hole on the front side of the carrying box with a tight friction fit to enable the rigid planar surface to be secured to the front side of the carrying box with the protrusions engaging the hand hole on the front side of the carrying box with a tight friction fit in a second position for securing the rigid planar surface to the front side of the carrying box for storage and transporting.

2. The combination cover and seat of claim 1 wherein the carrying box is mounted on a two-wheeled cart having a long handle and the rigid planar surface has at least one recess on an edge of the planar surface to accommodate the handle therein with the cover/seat installed over the top opening of the carrying box.

3. The combination cover and seat of claim 1 wherein the rigid planar surface further comprises an encircling flange which extends around the top opening of the carrying box and the flange has corner protrusions which engage the exterior surfaces of the carrying box at the corners to secure the rigid planar surface over the carrying box opening.

4. The combination cover and seat of claim 1 wherein the rigid planar surface is formed of molded plastic with a ribbed waffle pattern on a bottom surface for sufficient strength to enable a person to sit on the rigid planar surface.

5. In combination a folding carrying box and a combination cover and seat for the folding carrying box, the combination comprising:
   a carrying box comprising a bottom, a back side mounted on a two-wheeled hand truck having a pair of back wheels and a long extensible and retractable handle, a front side having a hand hole therein to admit a hand of a user for lifting the carrying box, a pair of opposing side panels between the front side and the back side, the side panels each structured to fold in along a hinged vertical fold line in each of the side panels to collapse the carrying box to fold flat for storage, and a top opening in the carrying box;
   a rigid planar surface smooth and flat on top conforming in shape to the top opening in the carrying box, the rigid planar surface fitting securely thereon in a first position over the top opening to serve as a cover and a seat on top of the carrying box with the carrying box in a stationary position with the front of the carrying box contacting the ground, the rigid planar surface having at least two protrusions on a bottom surface, the protrusions configured to engage the hand hole on the front side of the carrying box with a tight friction fit to enable the rigid planar surface to be secured to the front side of the carrying box with the protrusions engaging the hand hole on the front side of the carrying box with a tight friction fit in a second position for securing the rigid planar surface to the front side of the carrying box for storage and transporting so that the rigid planar surface can remain attached to the front side of the carrying box when it is folded flat.

* * * * *